US008992879B2

(12) United States Patent
Miyamoto et al.

(10) Patent No.: US 8,992,879 B2
(45) Date of Patent: Mar. 31, 2015

(54) METHOD OF PRODUCING CARBON FIBER (75) Inventors: Daisuke Miyamoto, Minato-ku (JP); Eiji Kambara, Minato-ku (JP)

(73) Assignee: Showa Denko K.K., Tokyo (JP)

( * ) Notice: Subject to any disclaimer, the term of this patent is extended or adjusted under 35 U.S.C. 154(b) by 302 days.

(21) Appl. No.: 13/582,273

(22) PCT Filed: Mar. 2, 2011

(86) PCT No.: PCT/JP2011/001233
§ 371 (c)(1),
(2), (4) Date: Aug. 31, 2012

(87) PCT Pub. No.: WO2011/108269
PCT Pub. Date: Sep. 9, 2011

(65) Prior Publication Data
US 2012/0321543 A1     Dec. 20, 2012

(30) Foreign Application Priority Data

Mar. 2, 2010  (JP) ................................ 2010-044963

(51) Int. Cl.
*B01J 37/02* (2006.01)
*B01J 37/08* (2006.01)
(Continued)

(52) U.S. Cl.
CPC ............... *D01F 9/127* (2013.01); *B01J 23/745* (2013.01); *B01J 35/0013* (2013.01);
(Continued)

(58) Field of Classification Search
CPC .............. C01B 31/022; C01B 31/0226; C01B 31/0233; C01B 31/024; C01B 31/0246; C01B 31/0253; C01B 31/026; C01B 31/0266; C01B 31/0273; C01B 31/028; C01B 31/0286; C01B 31/0293

USPC ........ 423/447.1–447.3, 445 B; 977/742–754, 977/842–848; 502/100
See application file for complete search history.

(56) References Cited

U.S. PATENT DOCUMENTS

2006/0104884 A1*  5/2006  Shaffer et al. ............. 423/445 R

FOREIGN PATENT DOCUMENTS

| EP | 1 154 050 A1 | 11/2001 |
| EP | 1 977 997 A1 | 10/2008 |

(Continued)

OTHER PUBLICATIONS

Supplementary European Search Report issued in EP Application No. 11750382 completed Sep. 20, 2013.
(Continued)

*Primary Examiner* — Daniel C McCracken
(74) *Attorney, Agent, or Firm* — Sughrue Mion, PLLC (57) ABSTRACT

A method of producing carbon fibers, in which the producing method comprises allowing a supported type catalyst and a carbon atom-containing compound to come in contact with each other in a heating zone, wherein the supported type catalyst is prepared by a method comprising impregnation of a powdery carrier with colloid containing catalyst to support particles of the catalyst on the powdery carrier having a specifically developed crystal plane such as a powdery carrier being 4 or more in the ratio ($I_1/I_2$) of the intensity $I_1$ of the strongest peak to the intensity $I_2$ of the second strongest peak observed in X-ray diffraction, or a powdery carrier having the ratio ($I_1/I_2$) of the intensity $I_1$ of the strongest peak to the intensity $I_2$ of the second strongest peak observed in X-ray diffraction of 1.5 times or more the ratio ($I_{1s}/I_{2s}$) of the intensity $I_{1s}$ of the strongest peak to the intensity $I_{2s}$ of the second strongest peak described in JCPDS. A composite material is prepared by blending the carbon fibers prepared by the method with, for example, a resin.

16 Claims, 4 Drawing Sheets

(51) Int. Cl.
  *D01F 9/12* (2006.01)
  *D01F 9/127* (2006.01)
  *B01J 23/745* (2006.01)
  *B01J 35/00* (2006.01)
  *B01J 37/00* (2006.01)
  *B82Y 30/00* (2011.01)
  *B82Y 40/00* (2011.01)
  *C01B 31/02* (2006.01)
  *C01G 49/08* (2006.01)

(52) U.S. Cl.
  CPC ........... *B01J 37/009* (2013.01); *B01J 37/0211* (2013.01); *B82Y 30/00* (2013.01); *B82Y 40/00* (2013.01); *C01B 31/0206* (2013.01); *C01B 2202/04* (2013.01); *C01B 2202/36* (2013.01); *C01G 49/08* (2013.01); *C01P 2004/61* (2013.01); *Y10S 977/902* (2013.01); *Y10S 977/842* (2013.01)
  USPC ............... 423/447.3; 423/447.1; 502/100; 977/902; 977/842

(56) References Cited

FOREIGN PATENT DOCUMENTS

| | | |
|---|---|---|
| JP | 57-127449 A | 8/1982 |
| JP | 2004-534715 A | 11/2004 |
| JP | 2008-133177 A | 6/2008 |
| WO | 03/008331 A1 | 1/2003 |

OTHER PUBLICATIONS

Hiroki Ago et al., "Roles of Metal-Support Interaction in Growth of Single-and Double-Walled Carbon Nanotubes Studied with Diameter-Controlled Iron Particles Supported on MgO", The Journal of Physical Chemistry B., vol. 108, No. 49, Nov. 12, 2004, pp. 18908-18915.

Zhu D et al., "Influence of bias voltage on morphology and structure of MgO thin films prepared by cathodic vacuum arc deposition", Surface and Coatings Technology, Elsevier, Amsterdam, NL, vol. 201, No. 6, Dec. 4, 2006, pp. 2387-2391.

Ago H et al., "Aligned growth of isolated single-walled carbon nanotubes programmed by atomic arrangement of substrate surface", Chemical Physics Letters, Elsevier BV, NL, vol. 408, No. 4-6, Jun. 17, 2005, pp. 433-438.

* cited by examiner

METHOD OF PRODUCING CARBON FIBER

TECHNICAL FIELD

The present invention relates to a method of producing carbon fibers. More specifically, the present invention relates to a method of efficiently producing carbon fibers that can impart high electrical conductivity and high thermal conductivity to, for example, a resin to which only a small amount of the carbon fibers are added.

BACKGROUND ART

It is known that a resin composite material having electrical conductivity or thermal conductivity can be prepared by blending a carbon filler such as carbon black, filamentous carbon and the like, a metal filler such as metal powder and the like, with a matrix material of a thermosetting resin or a thermoplastic resin.

Electrically conductive resin composite materials are expected to be used in the fields of, for example, electrostatic discharge (ESD) and electromagnetic wave shielding. However, resin composite materials containing conventional carbon fillers can merely have electrical conductivity of a volume resistivity of about $1 \times 10^6$ $\Omega \cdot cm$. Consequently, it can be used only in the fields where even low electrical conductivity is acceptable, such as antistatic materials and ESD protective elements, and cannot be practically used in the fields where high electrical conductivity is required, such as electromagnetic wave shielding materials.

A carbon nanotube is known as a carbon filler. The carbon nanotube can be produced by, for example, chemical vapor deposition (hereinafter, referred to as CVD). In the CVD, a carbon nanotube is produced using a catalyst generated by decomposing an organic metal complex, a metal salt, or the like in a gas phase reaction system or using a catalyst introduced into a gas phase reaction system in a colloidal state (Patent Literatures 1 to 3); or a carbon nanotube is produced using a supported type catalyst prepared by supporting catalyst particles on a carrier (see Patent Literature 7 or Non-Patent Literature 1).

Carbon fibers produced by the former method using an organic metal complex or the like tend to have defects in the graphite layers. Accordingly, graphitization by heating the resulting carbon fibers at high temperature is necessary to obtain an effect as an electrically conductive filler.

The latter method using a supported type catalyst includes a method of using a basal plate (substrate method: see Patent Literatures 4 to 6) and a method using a powder-like carrier. In the substrate method, carbon nanotubes are generated on a basal plate carrying a catalyst. In order to produce a large amount of carbon nanotubes by the substrate method, a large number of basal plates are required, resulting in low efficient productivity. In addition, it is necessary to collect the generated carbon nanotubes from the basal plates, resulting in an increase in number of steps uneconomically. Accordingly, the substrate method has not been industrially used yet.

In contrast, the method using a powder-like carrier can secure a large surface area even in a small volume and therefore has high efficient productivity. As the powder-like carrier, fine powder having a large specific surface area, such as alumina, magnesia, silica, or zeolite, has been generally used. In the carbon nanotubes prepared by the conventionally used powder-like supported-type catalyst, however, a composite material having desired high electrical conductivity cannot be obtained by adding a small amount of the carbon nanotubes to a resin. In order to obtain a composite material having high electrical conductivity, it is necessary to blend a large amount of the carbon nanotubes with a resin. A resin blended with a large amount of carbon nanotubes, however, notably loses excellent characteristics intrinsically possessed by the resin.

CITATION LIST

Patent Literature

Patent Literature 1: JP 2003-73930 A
Patent Literature 2: JP 2003-171832 A
Patent Literature 3: JP 2005-225757 A
Patent Literature 4: JP 2007-268319 A
Patent Literature 5: JP 2008-169092 A
Patent Literature 6: JP 2001-62299 A
Patent Literature 7: WO 2007/074629
Patent Literature 8: JP 2008-133177 A

Non-Patent Literature

Non-Patent Literature 1: J. Phys. Chem. B, 2004, 108, 18908.

SUMMARY OF THE INVENTION

Problems to be Resolved by the Invention

It is an object of the present invention to provide a method of efficiently producing carbon fibers that can impart high electrical conductivity and high thermal conductivity to, for example, a resin to which only a small amount of the carbon fibers is added.

Means of Solving the Problems

Patent Literature 8 shows an attempt of producing carbon fibers by using an electrofused magnesia carrier having a low specific surface area. Unfortunately, the amount of carbon fibers produced in accordance with the method described in Patent Literature 8 is small, and it is therefore difficult to apply the method to industrial production.

Accordingly, the present inventors have diligently studied for solving the above-described problems. As a result, the inventors have found that carbon fibers capable of imparting high electrical conductivity and high thermal conductivity to, for example, a resin to which only a small amount of the carbon fibers are added can be efficiently prepared by using a supported type catalyst where particles of a catalyst are supported on a powdery carrier having a specifically developed crystal plane by impregnating the powdery carrier with colloid containing the catalyst. In addition, the inventors have found that the carbon fibers are preferably aggregated in a specific state. The present invention has been accomplished by further conducting studies based on these findings.

That is, the present invention includes the following aspects.

(1) A method of producing carbon fibers, the method comprising: allowing a supported type catalyst and a carbon atom-containing compound to come in contact with each other in a heating zone, wherein the supported type catalyst is prepared by a method comprising impregnating a powdery carrier with colloid containing catalyst to support particles of the catalyst on the powdery carrier, in which the powdery carrier is 4 or more in the ratio ($I_1/I_2$) of the intensity $I_1$ of the strongest peak to the intensity $I_2$ of the second strongest peak observed in X-ray diffraction.

(2) The method according to aspect (1), wherein the powdery carrier contains Mg; the peak showing the strongest intensity $I_1$ in the X-ray diffraction comes from the plane (200); and the peak showing the second strongest intensity $I_2$ in the X-ray diffraction comes from the plane (220).

(3) The method according to aspect (2), wherein the powdery carrier contains magnesium oxide.

(4) The method according to aspect (3), wherein the magnesium oxide is electrofused magnesia.

(5) The method according to aspect (1), wherein the catalyst contains Fe.

(6) The method according to aspect (1), wherein the catalyst-containing colloid is $Fe_3O_4$ colloid.

(7) The method according to aspect (1), wherein the catalyst contained in the catalyst-containing colloid has a particle diameter of 1 to 100 nm.

(8) The method according to aspect (1), wherein the supported type catalyst is $5 \times 10^{-4}$ mol/m² or less per surface area of the powdery carrier in the supported amount (in terms of moles of catalyst metal element) of the catalyst particles.

(9) The method according to aspect (1), wherein the carbon fibers have a tube structure being from 0.1 to 0.9 in the ratio ($d_0/d$) of the inner diameter $d_0$ to the outer diameter d.

(10) The method according to aspect (1), wherein the carbon fibers have a tube structure having an outer diameter d of 1 to 100 nm and an inner diameter $d_0$ of 0.1 to 90 nm.

(11) The method according to aspect (1), wherein the carbon fibers are aggregated in such a manner that the fiber axes are approximately parallel to each other.

(12) The method according to aspect (1), wherein the catalyst-containing colloid is prepared by a method comprising heat treatment of two or more metal halides having different valences serving as catalyst sources and a surfactant having 8 or more carbon atoms in a liquid medium and purification treatment of the product obtained by the heat-treatment.

(13) A method of producing a supported type catalyst for producing carbon fibers, the method comprising: impregnating a powdery carrier with colloid containing a catalyst to support particles of the catalyst on the powdery carrier, in which the powdery carrier is 4 or more in the ratio ($I_1/I_2$) of the intensity $I_1$ of the strongest peak to the intensity $I_2$ of the second strongest peak observed in X-ray diffraction.

(14) The method according to aspect (13), the method further comprising preparation of the catalyst-containing colloid by a method comprising heat treatment of two or more metal halides having different valences serving as catalyst sources and a surfactant having 8 or more carbon atoms in a liquid medium and purification treatment of the product obtained by the heat-treatment.

(15) The method according to aspect (14), wherein the impregnating a powdery carrier with colloid containing a catalyst to support particles of the catalyst on the powdery carrier is performed by mixing the catalyst-containing colloid and the powdery carrier and drying the mixture.

(16) A method of producing carbon fibers, the method comprising: allowing a supported type catalyst and a carbon atom-containing compound to come in contact with each other in a heating zone, in which the supported type catalyst is prepared by a method comprising impregnating a powdery carrier with colloid containing the catalyst to support particles of the catalyst on the powdery carrier, in which the powdery carrier has a specifically developed crystal plane.

(17) A method of producing carbon fibers, the method comprising: allowing a supported type catalyst and a carbon atom-containing compound to come in contact with each other in a heating zone, in which the supported type catalyst is prepared by a method comprising impregnating a powdery carrier with colloid containing catalyst to support particles of the catalyst on the powdery carrier, in which the powdery carrier has the ratio ($I_1/I_2$) of the intensity $I_1$ of the strongest peak to the intensity $I_2$ of the second strongest peak observed in X-ray diffraction of 1.5 times or more the ratio ($I_{1s}/I_{2s}$) of the intensity $I_{1s}$ of the strongest peak to the intensity $I_{2s}$ of the second strongest peak described in JCPDS.

Advantage Effects of the Invention

According to the method of the present invention, it is possible to efficiently prepare carbon fibers that can impart high electrical conductivity and high thermal conductivity to, for example, a resin to which only a small amount of the carbon fibers is added.

The reasons of that the carbon fibers prepared by the method of the present invention have, for example, a high electrical conductivity-imparting effect is not clear, but are presumed as follows.

It is presumed that an increase in aspect ratio and an improvement in dispersibility into a matrix material are important for enhancing the electrical conductivity-imparting effect. In one method, the aspect ratio is increased by decreasing the fiber diameter. For that, it is important to prepare catalyst particles having fine particle diameters and to maintain the fine particles even in contact with a carbon atom-containing compound at high temperature. The fine catalyst precursor particles can be prepared by a method such as a colloid method and the like. As in Patent Literatures 1 to 3 mentioned above, in the method of spraying a catalyst or a catalyst compound to a gas phase, coarsening by aggregation due to collision between catalyst particles proceeds before the catalyst particles come in contact with the carbon-containing compound at high temperature. Accordingly, it is important to prevent the aggregation by, for example, using a carrier.

It is known that dispersibility of carbon fibers in a resin is high when the carbon fibers are vertically oriented on a substrate compared with fibers entangling with each other. In an example of carbon fibers produced by the method according to a preferred embodiment of the present invention, the carbon fibers are not vertically oriented, but are bent and curvy as aggregates. However, the directions of fiber axes of the carbon fibers extend in approximately the same directions. Accordingly, it is believed that the degree of entangling of the fibers is low and thereby the carbon fibers added to a matrix material can be satisfactorily dispersed therein.

As shown in Comparative Examples below, in the case of using fine magnesia powder usually used as a carrier, in particular, in the case of using light-burnt magnesia showing poor crystal growth as a carrier, carbon fibers that entangle with each other and thereby show low dispersibility tend to be generated.

In contrast, when the plane (200) of crystals particularly develops with anisotropy as the carrier used in the preferred embodiment of the present invention, carbon fibers grow on this plane (200) in a bundle state with uniform direction of the fiber axes. This tendency is particularly notable in the case of using a catalyst supported using a colloidal solution, and such a function is seldom obtained in a usual method of performing impregnation with a solution of a catalyst precursor. In the case of using the solution, catalyst particles tend to be generated in grain boundaries or pores between primary particles rather than on the crystal surfaces. On the other hand, in the case of using a colloidal solution, due in part to the effects of, for example, the viscosity thereof, catalyst particles tend to be generated on the crystal surfaces. Alternatively, it is presumed that colloidal particles are arranged in a relatively orderly manner by interaction with specific surfaces of crystals when a catalyst is supported using a colloidal solution and then they are dried.

It is believed that fine carbon fibers showing high dispersibility are thus generated by using catalyst particles supported on a carrier having specifically developed crystal planes, which has been prepared using a colloidal solution, and thereby that the electrical conductivity and mechanical characteristics of a matrix material are considerably improved when the fibers, even in a small amount, are added thereto.

DESCRIPTION OF EMBODIMENTS

The method of producing carbon fibers of the present invention comprises bringing a supported type catalyst and a carbon atom-containing compound into contact with each other in a heating zone.

The supported type catalyst used in the present invention is prepared by a method comprising impregnating a powdery carrier with colloid containing the catalyst to support particles of the catalyst on the powdery carrier.

"Powdery Carrier"

The powdery carrier used in the supported type catalyst in the present invention preferably has a specifically developed crystal plane.

Whether such a specific crystal plane has developed or not can be judged by, for example, comparing X-ray diffraction data with that of (isotropic) powder. The X-ray diffraction data of isotropic powder are described in, for example, Joint Committee on Powder Diffraction Standards (JCPDS). According to JCPDS, for example, in magnesia, the ratio $(I_{1s}/I_{2s})$ of the intensity $I_{1s}$ of the peak coming from the plane (200) to the intensity $I_{2s}$ of the peak coming from the plane (220) is 2.6 (No. 45-946). In alumina, the ratio $(I_{1s}/I_{2s})$ of the intensity $I_{2s}$ of the peak coming from the plane (104) to the intensity $I_{1s}$ of the peak coming from the plane (116) is 1.1 (No. 46-1212); and the ratio $(I_{1s}/I_{2s})$ of the intensity $I_{1s}$ of the peak coming from the plane (113) to the intensity $I_{1s}$ of the peak coming from the plane (116) is 1.3 (10-173). In calcia, the ratio $(I_{1s}/I_{2s})$ of the intensity $I_{1s}$ of the peak coming from the plane (200) to the intensity $I_{1s}$ of the peak coming from the plane (111) is 2.5 (48-1467) to 2.7 (37-1497). The figures in the parenthesis are JCPDS card numbers. $I_{1s}$ represents the intensity of the strongest peak in the peaks described in JCPDS; and $I_{2s}$ represents the intensity of the second strongest peak in the peaks described in JCPDS.

In contrast, in the powdery carrier used in the present invention, the ratio $(I_1/I_2)$ of the intensity $I_1$ of the strongest peak to the intensity $I_2$ of the second strongest peak observed in powder X-ray diffraction is larger than the ratio $(I_{1s}/I_{2s})$ of the intensity $I_{1s}$ of the strongest peak to the intensity $I_{2s}$ of the second strongest peak described in JCPDS, preferably 1.5 times or more the ratio $(I_{1s}/I_{2s})$ of the intensity $I_{1s}$ of the strongest peak to the intensity $I_{2s}$ of the second strongest peak described in JCPDS, and more preferably 2 times or more the ratio $(I_{1s}/I_{2s})$ of the intensity $I_{1s}$ of the strongest peak to the intensity $I_{1s}$ of the second strongest peak described in JCPDS. Note that $I_1$ represents the intensity of the strongest peak in actually measured peaks and that $I_2$ represents the intensity of the second strongest peak in actually measured peaks. Examples of the ratio $(I_1/I_2)$ of the intensity $I_1$ of the strongest peak to the intensity $I_2$ of the second strongest peak observed in powder X-ray diffraction include the ratio $(I_1/I_2)$ of the intensity $I_1$ of the peak coming from the plane (200) to the intensity $I_2$ of the peak coming from the plane (220) in magnesia; the ratio $(I_1/I_2)$ of the intensity $I_1$ of the peak coming from the plane (104) to the intensity $I_2$ of the peak coming from the plane (116) in alumina; the ratio $(I_1/I_2)$ of the intensity $I_1$ of the peak coming from the plane (113) to the intensity $I_2$ of the peak coming from the plane (116) in alumina; and the ratio $(I_1/I_2)$ of the intensity $I_1$ of the peak coming from the plane (200) to the intensity $I_2$ of the peak coming from the plane (111) in calcia.

In an embodiment of the powdery carrier used in the present invention, the ratio $(I_1/I_2)$ of the intensity $I_1$ of the strongest peak to the intensity $I_2$ of the second strongest peak observed in powder X-ray diffraction is preferably 4 or more, more preferably 5 or more, and most preferably 6 or more. A too small peak intensity ratio $(I_1/I_2)$ tends to make it difficult to obtain desired electrical conductivity or thermal conductivity.

When the powdery carrier contains Mg, the peak showing the strongest intensity $I_1$ observed in X-ray diffraction preferably comes from the plane (200), and the peak showing the second strongest intensity $I_2$ preferably comes from the plane (220).

The chemical species constituting the powdery carrier are not limited. Examples of the chemical species include oxides such as alumina, zirconia, magnesia, silica, calcia and the like; and nitrides such as aluminum nitride and the like. Among these chemical species, magnesium oxide is preferred, and electrofused magnesia, i.e., magnesia produced by an electric melting method is more preferred.

The powdery carrier preferably has a particle diameter of 1 to 5000 μm, more preferably 10 to 500 μm, and most preferably 40 to 200 μm. The particle diameter of the powdery carrier can be confirmed by sieving.

The powdery carrier preferably has a relatively smaller specific surface area compared with that generally used in the art. Specifically, the specific surface area of the powdery carrier is preferably 1 to 10 m$^2$/g, more preferably 1.5 to 3 m$^2$/g.

The powdery carrier preferably has a bulk density (measured in accordance with JIS Z-2512 (determination of tap density)) of 0.8 to 3 g/cm$^3$, more preferably 1 to 2.5 g/cm$^3$.

The method of preparing the powdery carrier is not particularly limited and can be an electric melting method. A commercially available powdery carrier can also be used.

"Colloid Containing Catalyst (Hereinafter, Also Referred to as "Catalyst Colloid")"

The catalyst colloid used for preparing the supported type catalyst is prepared by dispersing a fine catalyst in a liquid medium. The particle diameter of the catalyst in the catalyst colloid is not particularly limited, but is preferably 1 to 100 nm, more preferably 1 to 50 nm, and most preferably 1 to 20 nm. Note that the particle diameter of the catalyst in the catalyst colloid is an average diameter determined from an image observed by a transmission electron microscope (TEM).

The concentration of the catalyst particles contained in the catalyst colloid is preferably 0.1 to 5% by mass, more preferably 0.5 to 3% by mass. An excessively high concentration increases the viscosity of the catalyst colloid. This tends to make treatment for supporting the catalyst on a powdery carrier inconvenience. An excessively low concentration tends to increase the number of steps for supporting a desired amount of the catalyst.

The catalyst colloid may be prepared by any method without particular limitation. Examples of the method include a method of preparing colloid in which fine metal particles are dispersed by thermally decomposing a carbonyl metal or the like in a liquid medium containing a surfactant; a method of preparing colloid in which metal particles are dispersed by reacting a metal catalyst source and a reducing agent such as sodium borohydride, lithium borohydride and the like in a liquid medium containing a surfactant; and a method (microemulsion method) of preparing colloid in which metal particles are dispersed by replacing a polar solvent in which a metal catalyst source is dissolved by a nonpolar solvent in the presence of a surfactant.

In the present invention, the catalyst colloid is preferably prepared from two or more metal halides having different valences serving as catalyst sources in the presence of a surfactant. More specifically, the catalyst colloid is preferably prepared by a method comprising heat treatment of two or more metal halides having different valences serving as catalyst sources and a surfactant having 8 or more carbon atoms in a liquid medium and purification treatment of the product obtained by the heat treatment. The upper limit of the heating temperature is preferably a temperature lower than the boiling point of the liquid medium by 10° C., more preferably a temperature lower than the boiling point of the liquid medium by 20° C. According to such a method, catalyst colloid can be prepared under preparation conditions of low temperature, specifically, at 100° C. or less, and thereby at a low manufacturing cost.

The surfactant used in the preparation of the catalyst colloid is not particularly limited, but is preferably a surfactant that prevents catalyst particles from aggregating and can contribute to preparation of the catalyst particles having narrow particle size distribution. Specifically, surfactants having 8 or more carbon atoms are preferred.

The surfactant may be an anionic surfactant, a cationic surfactant, or a nonionic surfactant. Examples of the anionic surfactant include carboxylate surfactants, sulfonate surfactants, sulfate surfactants, and phosphate surfactants. Examples of the cationic surfactant include quaternary ammonium surfactants and amine surfactants. Examples of the nonionic surfactant include polyethylene glycol surfactants, polyalcohol fatty acid ester surfactants, and higher alcohol surfactants.

Among these surfactants, alkali metal salts of higher fatty acids, which are one type of anionic surfactant, are preferred. In the alkali metal salts of higher fatty acids, preferred are alkali metal salts of higher fatty acids having long chain alkyl groups having 8 to 22 carbon atoms, and more preferred are alkali metal salts of higher fatty acids having long chain alkyl groups having 12 to 20 carbon atoms. Specific examples thereof include sodium caprylate, potassium caprylate, sodium laurate, potassium laurate, sodium myristate, potassium myristate, sodium palmitate, potassium palmitate, sodium stearate, potassium stearate, sodium oleate, potassium oleate, sodium linoleate, and potassium linoleate. Alternatively, instead of the alkali metal salt of higher fatty acid or together with the alkali metal salt of higher fatty acid, a combination of free fatty acid, such as caprylic acid, lauric acid, myristic acid, palmitic acid, stearic acid, oleic acid, linoleic acid and the like, and an alkaline material may be used. The concentration of the surfactant when catalyst colloid is prepared is preferably 1 to 50% by mass, more preferably 10 to 30% by mass.

The liquid medium used in preparation of the catalyst colloid is not particularly limited and may be any liquid medium that can uniformly disperse catalyst particles, and examples thereof include water and organic solvents such as alcohols, ketones, esters, hydrocarbons and the like. From the viewpoint of satisfactorily dispersing catalyst particles, organic solvents having low polarity are preferred. Examples of the organic solvent having low polarity include pentane, hexane, benzene, toluene, diethyl ether, ethyl acetate, methylene chloride, and chloroform. In light of the catalyst-drying step, the liquid medium preferably has a boiling point of 150° C. or less, more preferably 20 to 80° C., more preferably 30 to 80° C., and most preferably 40 to 80° C. Examples of the liquid medium having such a boiling point include hexane, benzene, toluene, methylene chloride, chloroform, and ethyl acetate. Furthermore, from the viewpoint of wettability to a catalyst carrier, the liquid medium having low viscosity is preferred. Examples of the liquid medium having low viscosity include pentane, hexane, and diethyl ether. Consequently, an example of the liquid medium satisfying these requirements is hexane.

The catalyst source used for preparing the catalyst colloid is not particularly limited as long as it can enhance growth of carbon fibers. The catalyst source can be, for example, at least one metal element selected from the group consisting of elements in Groups 3 to 12 of the 18 Groups-type elemental Periodic Table recommended by IUPAC in 1990. Among these metal elements, at least one metal element selected from the group consisting of elements in Groups 3, 5, 6, 8, 9, and 10 is preferred, and at least one metal element selected from the group consisting of iron, cobalt, nickel, chromium, molybdenum, tungsten, vanadium, titanium, ruthenium, rhodium, palladium, platinum, and rare earth elements is particularly preferred. Examples of a compound (catalyst precursor) containing the metal element functioning as such a catalyst include inorganic salts such as nitrates, sulfates, halides and the like; organic salts such as acetates and the like; organic complexes such as acetylacetone complexes and the like; and organic metal compounds. Among these compounds, halides have high reactivity and seldom remain after reaction, which allows easy purification, and are therefore preferred from these viewpoints.

The reaction activity can be controlled by using two or more of these catalyst sources. The combination of the catalyst sources is preferably a combination of two or more metal compounds having different valences, more preferably a combination of two or more metal halides having different valences. Examples of preferred combination of the catalyst sources are described in, for example, JP 2008-174442A. Specifically, combinations of an element selected from Fe, Co, and Ni; an element selected from Ti, V, and Cr; and an element selected from Mo and W are preferred.

In the catalyst colloid, surplus materials, such as a surfactant and the like, that are undesirable for supporting a catalyst on a catalyst carrier and synthesis of carbon nanotubes are preferably removed by purification.

The method of purification is not particularly limited. Examples thereof include physical purification with an ultrafilter membrane and purification by decantation.

A more specific example of the purification is as follows: An appropriate amount of a polar solvent is added to catalyst colloid prepared by the method described above, followed by mixing. Subsequently, the mixture is separated into a catalyst precipitation layer and a supernatant layer by means of gravity force or centrifugal force. An appropriate amount of a polar solvent is further added to the separated supernatant, and the mixture is separated into a catalyst precipitation layer and a supernatant. This procedure is repeated several times, preferably two to three times. The separated catalyst precipitate layers are combined, and a liquid medium is added thereto for dispersion. By this process, catalyst colloid from which surplus materials, such as a surfactant and the like, are removed is prepared.

"Method of Supporting"

Subsequently, in the method of the present invention, the powdery carrier described above is impregnated with the catalyst colloid to support particles of the catalyst on the powdery carrier.

The procedure of the impregnation is not particularly limited. For example, impregnation may be performed by dropwise adding catalyst colloid in an amount equivalent to the liquid adsorption of a powdery carrier to the powdery carrier and then drying the mixture; or may be performed by mixing catalyst colloid and a powdery carrier in predetermined amounts and then drying the mixture. The dropping or mixing step and the drying step may be repeated until a predetermined amount of the catalyst is supported. The drying may be performed under conditions sufficient for volatilization of the liquid medium used and may be performed by heating the liquid medium to about the boiling point temperature.

The amount of the supported catalyst particles is not particularly limited. However, if the supporting amount is too large, aggregation of the supported catalyst particles is readily caused to reduce productivity of carbon fibers, and the obtained carbon fibers tend to contain a large amount of impurities derived from the supported type catalyst. As a result, when the carbon fibers are blended to, for example, a resin, the impurities affect the characteristics, such as electrical conductivity and the like. In contrast, if the supporting amount is too small, the carbon fiber-generating reaction tends to slowly progress to reduce the productivity. An appropriate supporting amount of catalyst particles (in terms of mole of catalyst metal element) varies based on the types of the powdery carrier or the catalyst colloid used and the method of supporting, but is, per surface area of the powdery carrier, preferably $5\times10^{-4}$ mol/m$^2$ or less, more preferably $1\times10^{-6}$ mol/m$^2$ or more and $5\times10^{-4}$ mol/m$^2$ or less, further more preferably $1\times10^{-6}$ mol/m$^2$ or more and $3\times10^{-4}$ mol/m$^2$ or less, more preferably $1\times10^{-6}$ mol/m$^2$ or more and $1\times10^{-4}$ mol/m$^2$ or less, and most preferably $1\times10^{-6}$ mol/m$^2$ or more and $1\times10^{-5}$ mol/m$^2$ or less.

"Reduction Treatment"

Before bringing a carbon atom-containing compound into contact with the supported type catalyst according to the present invention, the catalyst particles supported on a carrier may be reduced by bringing a reducing gas into contact with the supported type catalyst. Examples of the reducing gas include a gas containing hydrogen. However, excessive reduction treatment may hardly achieve the expected effect. Accordingly, in the present invention, a reduction treatment time as short as possible is preferred.

If the supported type catalyst is retained in a heating zone for an excessively long time before bringing a carbon atom-containing compound into contact with the supported type catalyst according to the present invention, the expected effect may be hardly achieved. Accordingly, in the case of placing the supported type catalyst in a reactor and then increasing the temperature, it is preferable to increase the rate of temperature rise and to bring the catalyst into contact with the carbon atom-containing compound immediately after the temperature has reached a predetermined temperature. Alternatively, it is preferable to simultaneously feed the supported type catalyst and the carbon atom-containing compound in the reactor after increasing the temperature of the reactor to a predetermined level.

"Carbon Atom-Containing Compound"

The carbon atom-containing compound used in the present invention is not particularly limited as long as it can function as a carbon source for carbon fibers. As the carbon atom-containing compound, the all compounds such as $CCl_4$, $CHCl_3$, $CH_2Cl_2$, $CH_3Cl$, $CO$, $CO_2$, $CS_2$ and the like can be used. Examples of particularly useful compounds include $CO$, $CO_2$, aliphatic hydrocarbons, and aromatic hydrocarbons and also include carbon atom-containing compounds containing elements such as nitrogen, phosphorus, oxygen, sulfur, fluorine, chlorine, bromine, iodine and the like.

Specific examples of preferred carbon atom-containing compounds include inorganic gases such as $CO$, $CO_2$ and the like; alkanes such as methane, ethane, propane, butane, pentane, hexane, heptane, octane and the like; alkenes such as ethylene, propylene, butadiene and the like; alkynes such as acetylene and the like; monocyclic aromatic hydrocarbons such as benzene, toluene, xylene, styrene and the like; polycyclic compounds having condensed rings such as indene, naphthalene, anthracene, phenanthrene and the like; cycloparaffines such as cyclopropane, cyclopentane, cyclohexane and the like; cycloolefins such as cyclopentene, cyclohexene, cyclopentadiene, dicyclopentadiene and the like; and aliphatic hydrocarbon compounds having condensed rings such as steroid and the like.

Other examples of the carbon atom-containing compound include derivatives of these hydrocarbons containing, oxygen, nitrogen, sulfur, phosphorus, halogens or the like. Examples of the derivatives include oxygen atom-containing compounds such as methanol, ethanol, propanol, butanol, dimethyl ether, diethyl ether and the like; sulfur atom-containing aliphatic compounds such as methyl thiol, methyl ethyl sulfide, dimethyl thioketone and the like; sulfur atom-containing aromatic compounds such as phenyl thiol, diphenyl sulfide and the like; sulfur or nitrogen atom-containing heterocyclic compounds such as pyridine, quinoline, benzothiophene, thiophene and the like; and halogenated hydrocarbons such as chloroform, carbon tetrachloride, chloroethane, trichloroethylene and the like.

Furthermore, examples of the carbon atom-containing compound include compositions containing carbon atom-containing compounds, such as natural gas, gasoline, heating oil, heavy oil, creosote oil, kerosene, turpentine oil, camphor oil, pine oil, gear oil, cylinder oil and the like. These carbon atom-containing compounds can be used alone or in combination of two or more thereof. Among these compounds, preferred are CO, methane, ethane, propane, butane, ethylene, propylene, butadiene, methanol, ethanol, propanol, butanol, acetylene, benzene, toluene, and xylene or mixtures composed of arbitrary combination thereof.

In order to bring the supported type catalyst and the carbon atom-containing compound into contact with each other in a heating zone, a carrier gas can be used. This carrier gas is preferably introduced to the heating zone together with the carbon atom-containing compound. Examples of the carrier gas include hydrogen, nitrogen, helium, argon, and krypton, and gas mixtures thereof. In the case where the carbon atom-containing compound is a compound other than carbon dioxide, carbon dioxide can be used as a carrier gas, but gases containing oxygen molecules ($O_2$) such as air and the like are unsuitable.

The carrier gas preferably contains hydrogen. The content of hydrogen in the gas is preferably 1% by volume or more, more preferably 30% by volume or more, and most preferably 85% by volume or more. Examples of the gas that can coexist with the gas containing hydrogen include nitrogen and the like. By introducing a gas containing hydrogen as the carrier gas to a heating zone, the catalyst particles supported on the carrier in the oxidized state are reduced to activate the supported type catalyst.

The carbon atom-containing compound that is a liquid or a solid at ordinary temperature is preferably vaporized and then introduced to a heating zone. The volume of the carbon atom-containing compound gas to be supplied varies depending on the supported type catalyst to be used, the carbon atom-containing compound, and the reaction conditions and therefore cannot be unambiguously determined, but the percentage based on volume of the carbon atom-containing compound gas, (flow rate of carbon atom-containing compound gas)/ [(flow rate of carrier gas)+(flow rate of carbon atom-containing compound gas)], is preferably 10 to 90% by volume, more preferably 30 to 70% by volume. For example, in the case of using ethylene as the carbon atom-containing compound, the gas volume is preferably in the range of 30 to 90% by volume.

The temperature in the heating zone varies depending on the types of the carbon atom-containing compound used, etc., but is preferably 400 to 1100° C., more preferably 500 to 800° C., and most preferably 700 to 800° C. If the temperature is too low or too high, the formation of carbon fibers tends to decrease. In high temperature, non-conductive materials tend to be by-produced and adhere to the carbon fiber surfaces. Such carbon fibers may be unsuitable for using as filler.

The carbon fibers prepared by the method of the present invention preferably have hollows at the centers thereof, a so-called tube structure. In the carbon fibers having a tube structure, the hollows may be continuously connected to each other in the longitudinal direction of the fibers or may be closed halfway to be disconnected. In the carbon fibers prepared by the method of the present invention, the graphene plane preferably extends approximately parallel to the fiber axis. In the present invention, the term "approximately parallel" means that the tilt of the graphene plane with respect to the fiber axis is within about ±15 degrees. A carbon fiber having only one graphene layer, a so-called single wall carbon nanotube, has a high surface energy and relatively low dispersibility in a resin, etc. Consequently, the effect of imparting electrical conductivity of such a carbon fiber tends to be low. In the case of intending to impart electrical conductivity, a carbon fiber having two graphene layers, a so-called double wall carbon nanotube, or a carbon fiber having three or more graphene layers, a so-called multi-wall carbon nanotube, is preferred. In particular, the multi-wall carbon nanotube is preferred.

The carbon fibers prepared by the method of the present invention preferably have a small fiber diameter, from the viewpoint of having a high electrical conductivity imparting effect. The upper limit of the fiber diameter d is preferably 100 nm, more preferably 50 nm, and most preferably 20 nm. However, a too small fiber diameter tends to cause a decrease in dispersibility in a resin, etc. Accordingly, the lower limit of the fiber diameter d is preferably 1 nm, more preferably 2 nm, and most preferably 4 nm. Therefore, in consideration of both the dispersibility and the electrical conductivity imparting effect, the fiber diameter d is preferably 2 to 20 nm, more preferably 4 to 20 nm.

When the carbon fiber has a tube structure, the inner diameter $d_0$ of the hollow is not particularly limited, but is preferably 0.1 to 90 nm. The ratio ($d_0$/d) of the inner diameter $d_0$ to the fiber diameter (outer diameter) d is not particularly limited, but is preferably 0.1 to 0.9, more preferably 0.3 to 0.9, and most preferably 0.6 to 0.9. Note that the fiber diameter d and the hollow inner diameter $d_0$ are respectively the average outer diameter and the average inner diameter determined based on an image observed by a transmission electron microscope (TEM).

The carbon fibers of a preferred embodiment according to the present invention are characterized by the curvy and bent shape, unlike the linear carbon fibers in conventional technology. Consequently, in a composite material, the carbon fibers of the present invention can have increased adhesiveness to matrix materials and high interface strength, compared to conventional linear carbon fibers, and therefore a decrease in mechanical characteristics of the composite material can be prevented.

Figure 1:
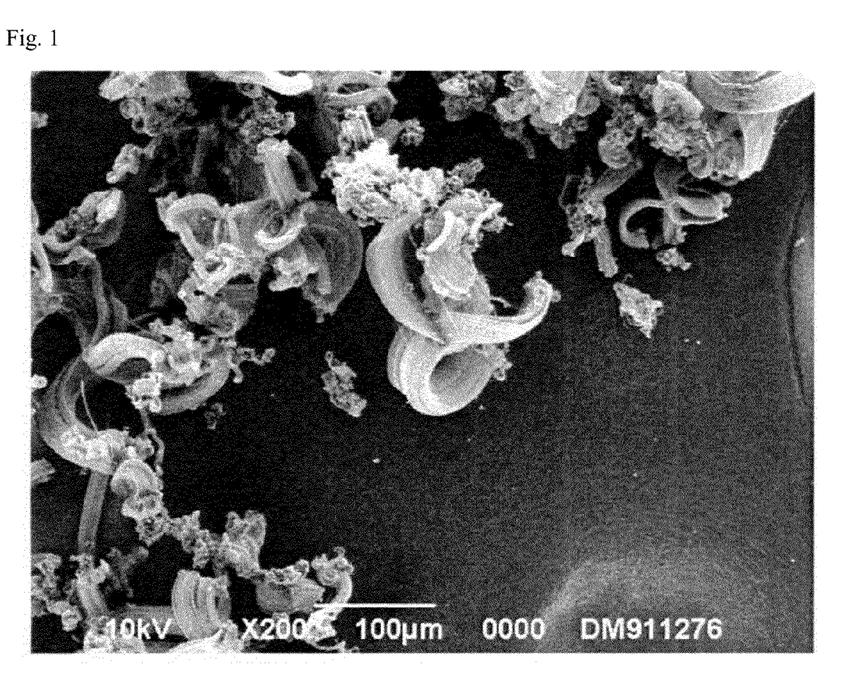
FIG. 1 is a scanning electron microscope photograph of carbon fibers produced in Example 1.
Figure 2:
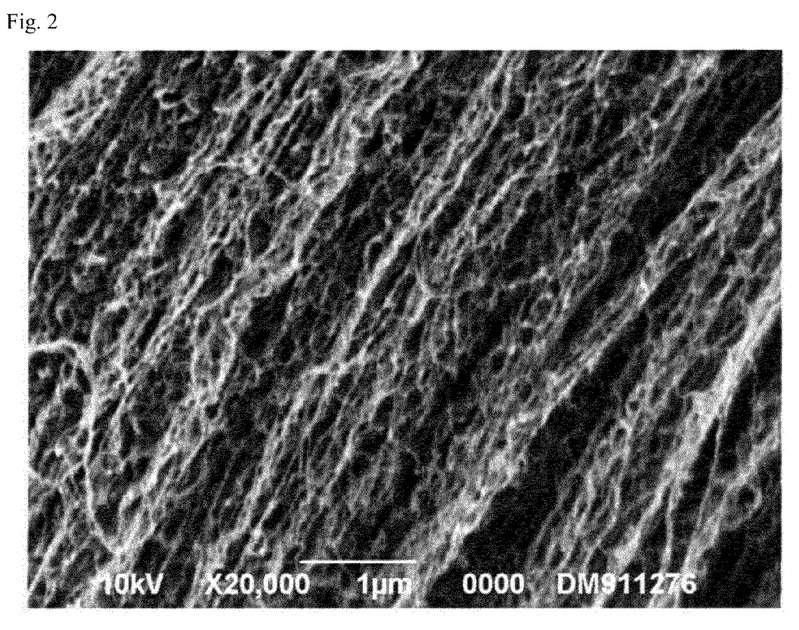
FIG. 2 is a scanning electron microscope photograph of carbon fibers produced in Example 1.

In the carbon fibers of a preferred embodiment according to the present invention, the fibers themselves are curvy and bent, but the respective fibers uniformly extend in the same directions in a belt or ribbon-like shape as aggregates (see FIGS. 1 and 2). As a result, the carbon fibers according to the present invention are aggregated in such a manner that the fiber axes are approximately parallel to each other. Accordingly, it is believed that the degree of entangling among the fibers is low to provide satisfactory dispersibility.

Figure 4:
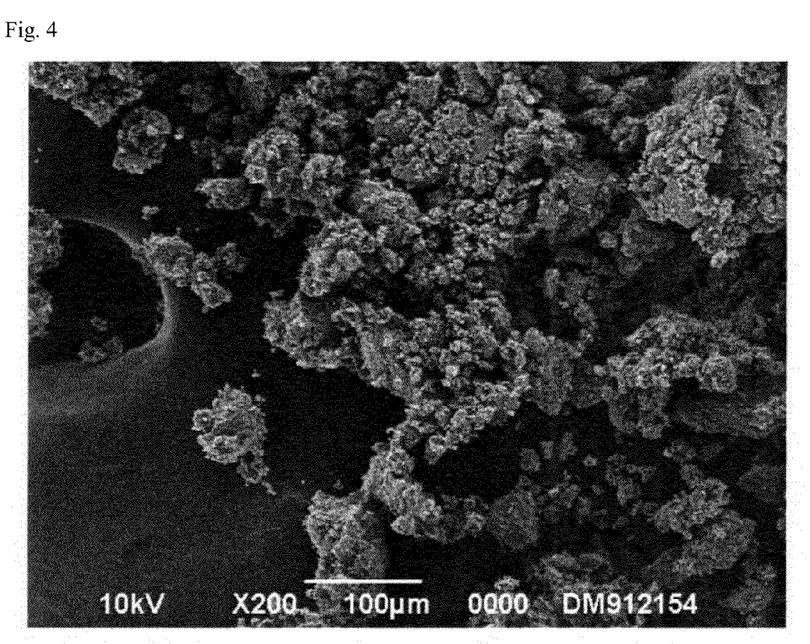
FIG. 4 is a scanning electron microscope photograph of carbon fibers produced in Comparative Example 1.
Figure 5:
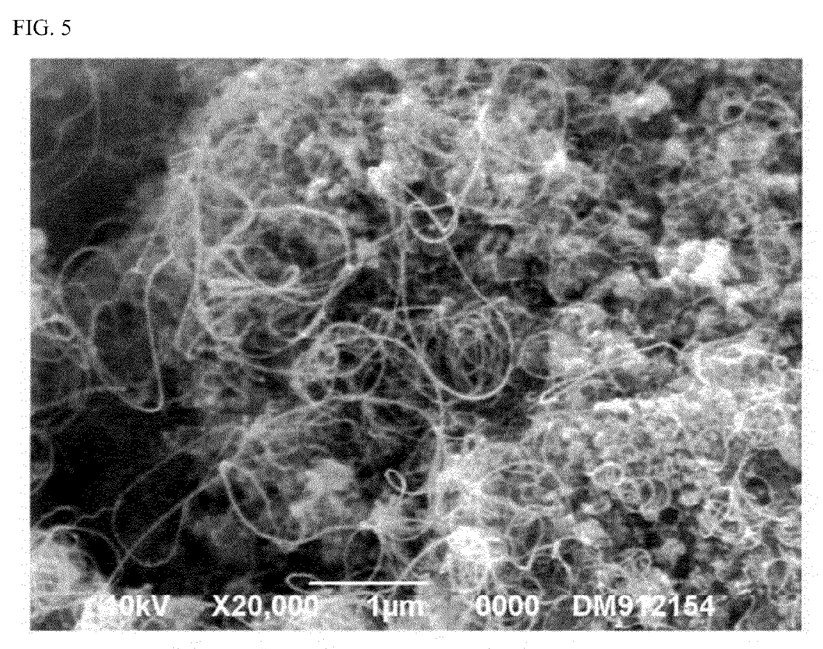
FIG. 5 is a scanning electron microscope photograph of carbon fibers produced in Comparative Example 1.

In contrast, carbon fibers prepared using a usual catalyst carrier having a high specific surface area contain atypical materials, and the fiber themselves are linear manner and largely sweep and also grow in random directions to form irregular aggregates or approximately spherical aggregates that are very strongly entangled being difficult to be disentangled into fibers (see FIGS. 4 and 5). Accordingly, an effect of imparting electrical conductivity to a resin composite material tends to be low.

A composite material can be formed by blending the carbon fibers according to the present invention with a matrix material and kneading the mixture. The amount of the carbon fibers contained in the composite material is preferably 0.5 to 30% by mass, more preferably 0.5 to 10% by weight, and most preferably 0.5 to 5% by weight. A too small content of the carbon fibers cannot impart sufficient electrical conductivity and thermal conductivity to the composite material. A too large content of the carbon fibers tends to deteriorate the characteristics of the matrix material.

Any matrix material can be used in the composite material without any limitation, but resins are preferred. The resin serving as the matrix material may be any of thermosetting resins, photo-curable resins, and thermoplastic resins.

Examples of the thermosetting resin include polyamide, polyether, polyimide, polysulfone, epoxy resins, unsaturated polyester resins, phenol resins and the like.

Examples of the thermoplastic resin include nylon resins, polyethylene resins, polyamide resins, polyester resins, polycarbonate resins, polyarylate resins and the like.

The composite material blended with the carbon fibers according to the present invention is suitable as a molding material for products required to have electrical conductivity and antistatic properties as well as shock resistance, for example, OA equipment, electronic equipment, electrically conductive packaging parts, electrically conductive sliding members, electrically and thermally conductive members, antistatic packaging parts, automobile parts to be coated with electrostatic painting, and the like. These products can be produced by a conventionally known molding method. Examples of the molding method include injection molding, blow molding, extrusion molding, sheet molding, heat molding, rotational molding, lamination molding, transfer molding and the like.

The carbon fibers according to the present invention are applicable to various electrode materials. For example, electrical conductivity, electrode strength, and battery characteristics can be improved by making composite materials from the carbon fibers according to the present invention as materials for various electrodes in accordance with the method described in JP 3960973 B, JP 3722965 B, JP 3618492 B, or JP 4031009B.

EXAMPLES

The present invention will now be specifically described by examples and comparative examples, but the examples shown below are merely intended to be illustrative and not to be construed as limiting the scope of the present invention in any way.

"Reagents"

Reagents used are as follows:

Iron (III) chloride hexahydrate (special grade reagent, manufactured by Junsei Chemical Co., Ltd.), Iron (II) chloride tetrahydrate (special grade reagent, manufactured by Wako Pure Chemical Industries, Ltd.), Sodium oleate (reagent manufactured by Wako Pure Chemical Industries, Ltd.), Electrofused magnesia KMAO (manufactured by Tateho Chemical Industries Co., Ltd.), Magnesia 500A (manufactured by Ube Material Industries, Ltd.), Magnesia (manufactured by Kishida Chemical Co., Ltd.), Sintered magnesia RA (manufactured by Tateho Chemical Industries Co., Ltd.), and Electrofused magnesia KMAOH-F (manufactured by Tateho Chemical Industries Co., Ltd.).

"BET Specific Surface Area"

The specific surface area was calculated by a BET method from the adsorbed amount of nitrogen gas at a liquid nitrogen temperature (77 K) using NOVA 1000 manufactured by Yuasa Ionics Inc.

"Bulk Density"

The bulk density was measured in accordance with JIS Z-2512 (determination of tap density).

"X-Ray Diffraction"

A powdery carrier was added little by little to a sample holder of a glass sample plate and pressed with glass each time to prepare a powder sample for X-ray diffraction in the sample holder so that the sample was uniform and had a sample surface on the same level as the sample plate. Measurement was performed using an X-ray diffractometer, X-ray Diffractometer Rigaku Geigerflex (manufactured by Rigaku Corp.) and CuKal as an X-ray source at an output of 40 kV and 30 mA, a scanning speed of 2°/min, and a measurement range of 20° to 80°. A ratio ($I_1/I_2$) of the intensity $I_1$ of the strongest peak (1st peak) to the intensity $I_2$ of the second strongest peak (2nd peak) was determined.

Example 1

Preparation of Catalyst Colloid

Under a nitrogen atmosphere, 0.36 g of iron (III) chloride hexahydrate and 0.13 g of iron (II) chloride tetrahydrate were dissolved in a solution mixture of 4 mL of ethanol, 3 mL of distilled water, and 7 mL of toluene. To this solution, 1.62 g of sodium oleate was added while stirring, followed by reflux in an oil bath at 74° C. for 4 hours. After cooling to room temperature, 20 mL of ethanol was added thereto, followed by solid-liquid separation by centrifugation (5000 rpm×10 min). The liquid portion was separated, and the remaining solid was dispersed in 20 mL of hexane.

To this dispersion, 10 mL of ethanol was added, followed by solid-liquid separation by centrifugation (5000 rpm×10 min). The liquid portion was separated, and the remaining solid was dispersed in 10 mL of hexane.

To the separated liquid portions, 5 mL of ethanol was added, followed by solid-liquid separation by centrifugation (5000 rpm×10 min). The liquid portion was separated, and the solid was dispersed in hexane. This procedure was further repeated once again.

The hexane dispersions of the solid prepared by the procedure above were combined and were used as catalyst colloid. The catalyst particles in the catalyst colloid had a particle diameter of 4 to 6 nm in observation by a transmission electron microscope (TEM). The catalyst particles were confirmed to be $Fe_3O_4$ by X-ray diffraction.

"Preparation of Supported Type Catalyst"

Electrofused magnesia KMAO was sieved to select those having a particle diameter of 20 to 45 μm to be used as powdery carrier A. Table 1 shows the characteristics of the carrier.

The catalyst colloid in an amount equivalent to the liquid adsorption of powdery carrier A was added dropwise to powdery carrier A, followed by drying at room temperature to prepare a supported type catalyst. The supported type catalyst was $2.7 \times 10^{-5}$ mol/m² in the amount of Fe supported per unit surface area of the powdery carrier.

"Synthesis of Carbon Fiber"

A horizontal reactor having a length of about 40 cm was installed at the center of a silica tube having an inner diameter of 3.2 cm and a length of 1 m, and a silica boat setting the supported catalyst was arranged thereon. A nitrogen gas was flowed at 500 mL/min therein.

Figure 3:
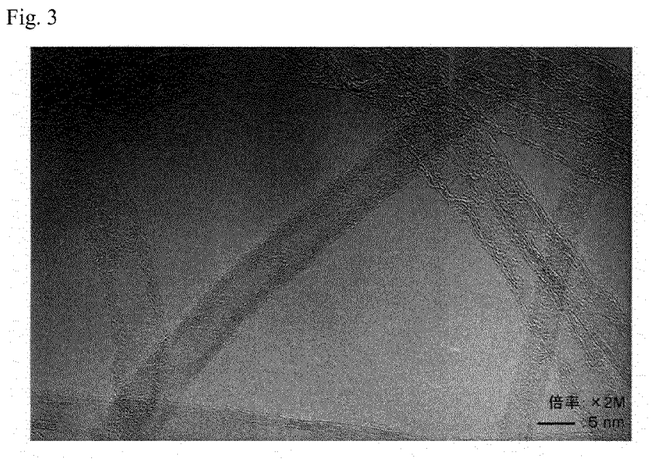
FIG. 3 a transmission electron microscope photograph of carbon fibers produced in Example 1.

The silica tube was installed in an electric furnace, which was heated to 700° C. over 20 min. Immediately after heating, the flowing of a nitrogen gas was stopped, and a gas mixture of ethylene and hydrogen (ethylene concentration: 50% by volume) was flowed at 500 mL/min for 30 min for reaction of generating carbon fibers. The flowing gas was switched to a nitrogen gas and was cooled to room temperature. The generated carbon fibers in an aggregated state were collected. FIGS. 1 and 2 show scanning electron microscope (SEM) photographs of the generated carbon fibers. As shown in FIG. 2, the carbon fibers themselves have a curvy and bent shape. As shown in FIGS. 1 and 2, some of the carbon fibers have a belt or ribbon-like shape as an aggregate in a state where the carbon fibers are aggregated in such a manner that the carbon fibers are arranged to be approximately parallel to each other along the fiber axes. FIG. 3 shows a transmission electron microscope (TEM) photograph of the generated carbon fibers. The resulting carbon fibers had a tube structure having a fiber diameter (outer diameter d) of 6 nm, an inner diameter $d_0$ of 4 nm, and a ratio of outer diameter/inner diameter of 1.5. The amount of the carbon fibers generated was 39 g per 1 g of Fe contained in the supported type catalyst used in this reaction.

Example 2

Electrofused magnesia KMAO was sieved to obtain those having a particle diameter of 45 to 150 μm to be used as powdery carrier B. Table 1 shows the characteristics of the carrier.

Carbon fibers were produced by preparing a supported type catalyst by the same procedure as in Example 1 except that powdery carrier B was used instead of powdery carrier A and that the amount of Fe supported per unit surface area of the powdery carrier was $5.7 \times 10^{-6}$ mol/m$^2$.

Carbon fibers similar to those prepared in Example 1 were generated. The carbon fibers themselves prepared in Example 2 had a curvy and bent shape. Some of the carbon fibers had a belt or ribbon-like shape as an aggregate in a state where the carbon fibers were aggregated in such a manner that the carbon fibers were arranged to be approximately parallel to each other along the fiber axes. The amount of the carbon fibers generated was 384 g per 1 g of Fe contained in the supported type catalyst used in this reaction.

Carbon fibers were produced by preparing a supported type catalyst by the same procedure as in Example 1 except that powdery carrier D was used instead of powdery carrier A.

Carbon fibers similar to carbon fibers prepared in Comparative Example 1 were generated. The carbon fibers prepared in Comparative Example 3 contain atypical materials, and the fibers themselves were linear manner and largely sweep and also grew in random directions to form aggregates being difficult to be disentangled into fibers. In this reaction, 33 g of carbon fibers was generated per 1 g of Fe in the supported type catalyst used.

TABLE 1

| | Powdery carrier | | | | | |
|---|---|---|---|---|---|---|
| | A | B | C | D | E | F |
| BET specific surface area (m$^2$/g) | 2 | 2 | 36 | 7 | 2 | 3 |
| Bulk density (g/cm$^3$) | 1.28 | 1.65 | 0.13 | 0.59 | 1.69 | 1.35 |
| Peak intensity ratio I$_1$/I$_2$ | 5.7 | 6.6 | 2.3 | 2.1 | 2.6 | 3.7 |
| Crystal plane of 1st peak | (200) | (200) | (200) | (200) | (200) | (200) |
| Crystal plane of 2nd peak | (220) | (220) | (220) | (220) | (220) | (220) |

Comparative Example 1

Magnesia 500A was used as powdery carrier C. Table 1 shows the characteristics of this carrier.

A catalyst solution was prepared by dissolving iron nitrate nonahydrate in methanol in an amount equivalent to the liquid adsorption.

Carbon fibers were produced by preparing a supported type catalyst by the same procedure as in Example 1 except that powdery carrier C was used instead of powdery carrier A and that a catalyst solution was used instead of the catalyst colloid.

FIGS. 4 and 5 show SEM photographs of the generated carbon fibers. As shown in FIG. 5, the fibers themselves were linear manner and largely sweep and also grew in random directions to form aggregates being difficult to be disentangled into fibers. As shown in FIG. 4, the appearance of the aggregates was irregular blocks. In this reaction, 10 g of carbon fibers were generated per 1 g of Fe in the supported type catalyst used.

Comparative Example 2

Carbon fibers were produced by preparing a supported type catalyst by the same procedure as in Example 1 except that the catalyst solution prepared in Comparative Example 1 was used instead of the catalyst colloid.

Carbon fibers similar to carbon fibers prepared in Comparative Example 1 were generated. The carbon fibers prepared in Comparative Example 2 contain atypical materials, and the fibers themselves were linear manner and largely sweep and also grew in random directions to form aggregates being difficult to be disentangled into fibers. In this reaction, 25 g of carbon fibers were generated per 1 g of Fe in the supported type catalyst used.

Comparative Example 3

Magnesia manufactured by Kishida Chemical Co., Ltd. was used as powdery carrier D. Table 1 shows the characteristics of the carrier.

Comparative Example 4

Sintered magnesia RA (manufactured by Tateho Chemical Industries Co., Ltd.) was used as powdery carrier E. Table 1 shows the characteristics of the carrier.

Carbon fibers were produced by preparing a supported type catalyst by the same procedure as in Example 1 except that powdery carrier E was used instead of powdery carrier A.

Carbon fibers similar to carbon fibers prepared in Comparative Example 1 were generated. The carbon fibers prepared in Comparative Example 4 contain atypical materials, and the fibers themselves were linear manner and largely sweep and also grew in random directions to form aggregates being difficult to be disentangled into fibers. In this reaction, 13 g of carbon fibers was generated per 1 g of Fe in the supported type catalyst used.

Comparative Example 5

Electrofused magnesia KMAOH-F (manufactured by Tateho Chemical Industries Co., Ltd.) was used as powdery carrier F. Table 1 shows the characteristics of the carrier.

Carbon fibers were produced by preparing a supported type catalyst by the same procedure as in Example 1 except that powdery carrier F was used instead of powdery carrier A.

Carbon fibers similar to carbon fibers prepared in Comparative Example 1 were generated. The carbon fibers prepared in Comparative Example 5 contain atypical materials, and the fibers themselves were linear manner and largely sweep and also grew in random directions to form aggregates being difficult to be disentangled into fibers. In this reaction, 1 g of carbon fibers was generated per 1 g of Fe in the supported type catalyst used.

A composite material was prepared by kneading part by mass of the carbon fiber prepared in Example 1, Comparative Example 1, or Comparative Example 3 and 9 parts by mass of a cycloolefin polymer (Zeonor 1420R, manufactured by Zeon Corp.) using a Laboplast mill (model: 30C150, manufactured by Toyo Seiki Seisaku-sho, Ltd.) under conditions of 270° C., 80 rpm, for 10 min. This composite material was heat-pressed under conditions of 280° C., 50 MPa, for 60 sec to produce a plate of 100 mm×100 mm×2 mm.

The volume resistivity of this plate was measured using a resistivity meter (Loresta-GP and Hiresta-UP, manufactured by Mitsubishi Chemical Corp.). Table 2 shows the results.

TABLE 2

| | Example | Comparative Example | | | |
|---|---|---|---|---|---|
| | 1 | 1 | 2 | 3 | 5 |
| Volume resistivity (Ω·cm) | $6.6 \times 10^1$ | $1.3 \times 10^{12}$ | $1.0 \times 10^{14}$ | $1.7 \times 10^{14}$ | $1.0 \times 10^{14}$ |

These results reveal that carbon fibers that can impart high electrical conductivity and high thermal conductivity to, for example, a resin to which only a small amount of the carbon fibers are added can be efficiently prepared by bringing a carbon atom-containing compound into contact with, in a heating zone, a supported type catalyst prepared by a method comprising impregnation of a powdery carrier with colloid containing catalyst to support particles of the catalyst on the powdery carrier having a specifically developed crystal plane, for example, a powdery carrier being 4 or more in the ratio $(I_1/I_2)$ of the intensity $I_1$ of the strongest peak to the intensity $I_2$ of the second strongest peak observed in X-ray diffraction, or a powdery carrier having the ratio $(I_1/I_2)$ of the intensity $I_1$ of the strongest peak to the intensity $I_2$ of the second strongest peak observed in X-ray diffraction of 1.5 times or more the ratio $(I_{1s}/I_{2s})$ of the intensity $I_{1s}$ of the strongest peak to the intensity $I_{2s}$ of the second strongest peak described in JCPDS.

The invention claimed is:

1. A method of producing carbon fibers, the method comprising:
    preparing a powdery carrier, in which the powdery carrier is 4 or more in the ratio $(I_1/I_2)$ of the intensity $I_1$ of the strongest peak to the intensity $I_2$ of the second strongest peak observed in X-ray diffraction;
    impregnating the powdery carrier with a catalyst colloid to make catalyst particles supported on the powdery carrier, in which the catalyst colloid comprises a catalytic metal element, to obtain a supported catalyst; and
    allowing a supported catalyst and a carbon atom-containing compound to come in contact with each other in a heating zone.

2. The method according to claim 1, wherein the powdery carrier comprises Mg; the peak showing the strongest intensity $I_1$ in the X-ray diffraction comes from the plane (200); and the peak showing the second strongest intensity $I_2$ in the X-ray diffraction comes from the plane (220).

3. The method according to claim 2, wherein the powdery carrier comprises magnesium oxide.

4. The method according to claim 3, wherein the magnesium oxide is electrofused magnesia.

5. The method according to claim 1, wherein the catalytic metal element comprises Fe.

6. The method according to claim 1, wherein the catalyst colloid is $Fe_3O_4$ colloid.

7. The method according to claim 1, wherein colloid particles contained in the catalyst colloid have particle diameter of 1 to 100 nm.

8. The method according to claim 1, wherein the supported catalyst is $5 \times 10^{-4}$ mol/m$^2$ or less per surface area of the powdery carrier in the supported amount (in terms of moles of the catalyst metal element) of the catalyst particles.

9. The method according to claim 1, wherein the carbon fibers have a tube structure being from 0.1 to 0.9 in the ratio $(d_0/d)$ of the inner diameter $d_0$ to the outer diameter d.

10. The method according to claim 1, wherein the carbon fibers have a tube structure having an outer diameter d of 1 to 100 nm and an inner diameter $d_0$ of 0.1 to 90 nm.

11. The method according to claim 1, wherein the carbon fibers are aggregated in such a manner that the fiber axes are approximately parallel to each other.

12. The method according to claim 1, wherein the method further comprising:
    heat treatment of two or more metal halides having different valences serving as catalyst sources and a surfactant having 8 or more carbon atoms in a liquid medium; and
    purification treatment of the product obtained by the heat-treatment, to prepare the catalyst colloid.

13. A method of producing a supported catalyst for producing carbon fibers, the method comprising the steps of:
    preparing a powdery carrier, in which the powdery carrier is 4 or more in the ratio $(I_1/I_2)$ of the intensity $I_1$ of the strongest peak to the intensity $I_2$ of the second strongest peak observed in X-ray diffraction; and
    impregnating the powdery carrier with a catalyst colloid to make catalyst particles supported on the powdery carrier, in which the catalyst colloid comprises a catalytic metal element.

14. The method according to claim 13, the method further comprising preparation of the catalyst colloid by a method comprising heat treatment of two or more metal halides having different valences serving as catalyst sources and a surfactant having 8 or more carbon atoms in a liquid medium and purification treatment of the product obtained by the heat-treatment, to prepare the catalyst colloid.

15. The method according to claim 14, wherein the step of impregnating comprises
    mixing the catalyst containing catalyst colloid and the powdery carrier to obtain a mixture, and
    drying the mixture.

16. A method of producing carbon fibers, the method comprising:
    preparing a powdery carrier, in which the powdery carrier has the ratio $(I_1/I_2)$ of the intensity $I_1$ of the strongest peak to the intensity $I_2$ of the second strongest peak observed in X-ray diffraction of 1.5 times or more the ratio $(I_{1s}/I_{2s})$ of the intensity $I_{1s}$ of the strongest peak to the intensity $I_{2s}$ of the second strongest peak described in Joint Committee on Powder Diffraction Standards (JCPDS);
    impregnating the powdery carrier with a catalyst colloid to make catalyst particles supported on the powdery carrier, in which the catalyst colloid comprises catalytic metal element, and thereby obtaining a supported catalyst; and
    allowing the supported catalyst and a carbon atom-containing compound to come in contact with each other in a heating zone.

* * * * *